United States Patent
Liu et al.

(10) Patent No.: US 12,536,059 B2
(45) Date of Patent: Jan. 27, 2026

(54) LEADER ELECTION FOR GROUPS OF APPLICATIONS

(71) Applicant: VMWARE, INC., Palo Alto, CA (US)

(72) Inventors: Xiaopei Liu, Beijing (CN); Zhengsheng Zhou, Beijing (CN); Wenfeng Liu, Beijing (CN); Donghai Han, Beijing (CN)

(73) Assignee: VMware, Inc., Palo Alto, CA (US)

( * ) Notice: Subject to any disclaimer, the term of this patent is extended or adjusted under 35 U.S.C. 154(b) by 635 days.

(21) Appl. No.: 17/960,259

(22) Filed: Oct. 5, 2022

(65) Prior Publication Data

US 2024/0028431 A1 Jan. 25, 2024

(30) Foreign Application Priority Data

Jul. 20, 2022 (WO) ................ PCT/CN2022/106709

(51) Int. Cl.
*G06F 9/54* (2006.01)
*G06F 9/50* (2006.01)

(52) U.S. Cl.
CPC ............ *G06F 9/547* (2013.01); *G06F 9/5072* (2013.01)

(58) Field of Classification Search
CPC ........ G06F 9/547; G06F 9/5072; G06F 9/526; G06F 9/5077
See application file for complete search history.

(56) References Cited

U.S. PATENT DOCUMENTS

| | | | | |
|---|---|---|---|---|
| 2020/0396282 | A1* | 12/2020 | Matican | H04L 67/1012 |
| 2021/0318985 | A1* | 10/2021 | Hrivnak | G06F 9/5011 |
| 2022/0206900 | A1* | 6/2022 | Zad Tootaghaj | G06F 9/5077 |
| 2023/0195522 | A1* | 6/2023 | Xiao | G06F 9/5083 |
| | | | | 718/104 |

OTHER PUBLICATIONS

Carlos Becker, "Leader Election inside Kubernetes" (Mar. 14, 2020), pp. 1-9 [retrieved from https://carlosbecker.com/posts/k8s-leader-election/].*

* cited by examiner

*Primary Examiner* — Brian W Wathen
(74) *Attorney, Agent, or Firm* — King Intellectual Asset Management (57) ABSTRACT

A computer-implemented method for electing a leader in a computing system is provided. In one aspect, a method includes identifying a computing resource for multiple container groups that each include one or more containers. A determination is made, from applications running in containers of the container groups, of multiple election candidate applications. Each election candidate application has an instance deployed in a corresponding container in each container group. For each container group, an election runner process is established within the container group. For each instance of each of the election candidate applications, a corresponding election watcher process is established. A communication link is established between the election runner process and each election watcher process. A request for leader election is transmitted from the election runner process to the computing resource. A response received from the computing resource. The response is transmitted to each election watcher process via the communication link.

20 Claims, 5 Drawing Sheets

- Deployment
    - Volumes
        - name: var-run-vmware,
        - type: hostPath,
        - path: /var/run/vmware
            - grpc service expose unix domain sockets under this path.
    - Pod * 3 replica
        - Leader election container
            - PID 1: Election-runner
        - App A container
            - PID 1: Election-watcher
            - Child process: App A
            - Volume mounts
                - var-run-vmware
        - App B container
            - PID 1: Election-watcher
            - Child process: App B
            - Volume mounts
                - var-run-vmware
        - App C container
            - PID 1: Election-watcher
            - Child process: App C
            - Volume mounts
                - var-run-vmware

LEADER ELECTION FOR GROUPS OF APPLICATIONS

CLAIM OF PRIORITY

The present application for patent claims the benefit of PCT Application No. PCT/CN2022/106709, filed Jul. 20, 2022, assigned to the assignee hereof and hereby expressly incorporated by reference herein.

BACKGROUND

Leader election is widely used in distributed computing where multiple applications are distributed among and performed by multiple computing nodes in a network. The leader application coordinates the multiple applications to perform a complex computing job. Conventionally, each election candidate application is situated on one computing node and runs for the leader separately from the other applications. This type of applications can be considered as monolithic applications. The leader election process elects one application as the leader application while the other non-elected candidate applications become standby applications.

SUMMARY

In general, this document describes a leader election process for a group of applications that have multiple instances deployed across multiple nodes. The disclosed process allows instances deployed on the same node to run to become the leader instance in a leader election together and respond to leader status changes together.

In one aspect, a computer-implemented method for electing a leader in a computing system is provided. The method includes identifying a computing resource for a plurality of container groups that each may include one or more containers. The method also includes determining, from applications running in containers of the container groups, a plurality of election candidate applications, where each of the plurality of election candidate applications has an instance deployed in a corresponding container in each of the plurality of container groups. For each of the plurality of container groups, the method also includes: establishing an election runner process within the container group; establishing, for each instance of each of the plurality of election candidate applications, a corresponding election watcher process; establishing a communication link between the election runner process and each election watcher process; transmitting a request for leader election from the election runner process to the computing resource; receiving a response from the computing resource; and transmitting the response to each election watcher process via the communication link.

In some implementations, receiving the response may include obtaining the response from a leader lock object, the response indicating whether the election runner process in a given container group is elected as the leader.

In some implementations, the response may indicate that the election runner process in the given container group is elected as the leader. The method may further include: running the instance of each of the plurality of election candidate applications in the given container group; periodically updating the leader lock object with a leader status by the election runner process in the given container group; and transmitting the leader status from the election runner process in the given container group to each election watcher process in the given container group.

In some implementations, the method may further include: in response to the leader status indicating that the election runner process in the given container group is no longer the leader, terminating the instance of each of the plurality of election candidate applications in the given container group.

In some implementations, the response may indicate that the election runner process in the given container group is not elected as the leader. The method may further include: causing the election runner process in the given container group to enter a standby state; and terminating the instance of each of the plurality of election candidate applications in the given container group.

In some implementations, the request transmitted by each container group indicates instances of the election candidate applications deployed in the container group.

In some implementations, for each container group, establishing the election runner process may include deploying an election runner container within the container group. Establishing the corresponding election watcher process for each instance of each of the plurality of election candidate applications may include initiating the corresponding election watcher process for each instance in a same corresponding container as the instance.

In some implementations, the method may include, for each container group, assigning each election watcher process a process identifier (MD) of a root process in the corresponding election watcher container.

In some implementations, the communication link may include a bidirectional remote procedure call (RPC) service.

In one aspect, a computing system configured to elect a leader from a plurality of election candidate applications is provided. The computing system includes a server and a plurality of container groups. The server allocates a computing resource for the plurality of container groups. Each of the plurality of election candidate applications has an instance deployed in a corresponding container in each of the plurality of container groups. Each of the plurality of container groups may include: an election runner process; an election watcher process corresponding to each instance of each of the plurality of election candidate applications; and a communication link between the election runner process and each election watcher process. The election runner process transmits a request for leader election to the computing resource. The election runner process receives a response from the computing resource. The election runner process transmits the response to each election watcher process via the communication link.

In some implementations, the response is obtained from a leader lock object and indicates whether the election runner process in a given container group is elected as the leader.

In some implementations, the response indicates that the election runner process in the given container group is elected as the leader. The instance of each of the plurality of election candidate applications in the given container group starts to run. The election runner process in the given container group periodically updates the leader lock object with a leader status. The election runner process in the given container group transmits the leader status to each election watcher process in the given container group.

In some implementations, the instance of each of the plurality of election candidate applications in the given container group terminates in response to the leader status indicating that the election runner process in the given container group is no longer the leader.

In some implementations, the response indicates that the election runner process in a given container group is not elected as the leader. The election runner process in the given container group enters a standby state. The instance of each of the plurality of election candidate applications in the given container group terminates.

In some implementations, the request transmitted by each container group indicates instances of the election candidate applications deployed in the container group.

In some implementations, within each container group, the election runner process is encapsulated within an election runner container, and the instance of each election candidate application and the election watcher process corresponding to the instance are encapsulated within a same election watcher container.

In some implementations, for each container group, each election watcher process is assigned a MD of a root process in the corresponding election watcher container.

In some implementations, the communication link may include a bidirectional RPC service.

In one aspect, a non-transitory computer-readable medium containing program instructions is provided. The instructions cause a processor to perform a number of operations. The operations include identifying a computing resource for a plurality of container groups that each comprise one or more containers. The operations include determining, from applications running in containers of the container groups, a plurality of election candidate applications, wherein each of the plurality of election candidate applications has an instance deployed in each of the plurality of container groups. The operations include, for each of the plurality of container groups: establishing an election runner process within the container group; establishing, for each instance of each of the plurality of election candidate applications, a corresponding election watcher process; establishing a communication link between the election runner process and each election watcher process; transmitting a request for leader election from the election runner process to the computing resource; receiving a response from the computing resource; and transmitting the response to each election watcher process via the communication link.

The subject matter described in this specification can be implemented in particular embodiments so as to realize one or more of the following advantages. Because instances deployed on the same node are treated as one entity in the leader election, the computing resources involved in running the multiple applications and the leader election for the multiple applications can be saved. As instances deployed on the same node can together track the leader status changes and respond timely, multiple applications can perform their respective tasks smoothly with less likelihood of being out of sync. In addition, a single application within a pod (or other group of applications, e.g., containers) can query, on behalf of a group of related applications that work together, a computing resource to become the leader, which reduces the number of messages sent between pods and computing resources, which reduces consumed bandwidth and associated latency.

Various features and advantages of the foregoing subject matter are described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Recent network architecture supports distributing an application across multiple nodes. According to this architecture, an application can have an instance running on multiple nodes, and application instances on the same node can interact with each other to perform a set of computing tasks, e.g., of a computing workload. For example, replicas of a group of applications that coordinate to perform tasks can be deployed on multiple nodes. It is desirable to assign the leader role to the application instances that are deployed on the same node rather than to instances of the applications within the group but spread out across different nodes. In other words, instances of multiple applications on the same node should rise and fall together in the leader election process.

The aforementioned recent network architecture can be implemented on a Kubernetes™ (K8S) platform, which is an open-source container orchestration system well-known in the art of software development. In an example K8S implementation, a server assigns a computing resource, such as a lease resource, to a deployment of multiple pods on one or more virtual computing nodes. Here, a pod refers to a group of one or more containerized applications (which are also referred to as containers). A container can include an application (e.g., code of the application) along with its dependencies, libraries, binaries, and/or other appropriate resources for running the application.

Each pod can have multiple containers that share resources of the pod, where, for example, one application instance is situated in one container of each pod. For example, consider a situation in which application A and application B are two applications that work together to perform computing tasks. Instances of these applications can be deployed together in multiple pods, e.g., for redundancy, scalability, etc. In this example, application A can have a first instance appA-instance1 in a container of pod 1 and a second instance appA-instance2 in a container of pod 2. Similarly, application B can have a first instance appB-instance1 in a container of pod 1 and a second instance appB-instance2 in a container of pod 2. The application instances in the same pod can work together to perform the tasks. In a leader election, appA-instance1 and appB-instance1 run together, and appA-instance2 and appB-instance2 run together.

When multiple instances of an application are deployed on different nodes, e.g., in different pods, an instance of the application will typically serve as the leader for the other instances. Each application can have a designated leader instance that is selected using a leader election that can be run by another application. The leader can continually query this election application to renew the leader position and the other instances can also query the election application to become a leader. In this way, if the leader fails, another leader is selected among the other instances quickly.

A sidecar can be used to handle a leader election in the above example. The sidecar can be implemented as a container that hosts an endpoint so that a container encapsulating an application instance can periodically query and determine whether the application instance is currently elected a leader. However, this query-based mechanism has several disadvantages. First, there is delay between queries so each application instance cannot obtain immediate knowledge of a leader status change. Reducing query interval would inevitably increase computing resource utilization because longer interval means more time would be wasted before the application instance can adapt to the leader status change. Second, each application must implement the source code to conduct the query, and this can sometimes require costly source code modification of existing applications and additional computations performed by each instance, thereby reducing computational resources that could be used to run other applications or services. Third, in the event that the query fails due to a problem with the application, the application instance issuing the query can lose track of the leader status.

In situations in which groups of applications work together and have instances deployed in multiple pods, this approach has additional disadvantages. For example, if appA-instance1 in a container of pod 1 becomes the leader for instances of application A and appB-instance2 in a container of pod 2 becomes the leader for instances of application B, these leaders have to coordinate across pods using networking resources to coordinate performing their respective tasks. This can increase bandwidth consumption and latency in performing the tasks. These disadvantages can make the query-based mechanism undesirable for scenarios where instances of multiple applications within the same pod run the leader election together. As a workaround to avoid the tradeoff between query interval and computing resource utilization, the multiple application instances within a pod would have to run election separately with different computing resources, resulting in multiple leaders within the same pod. This workaround has disadvantages because it can increase the complexity of the architecture and reduces efficiency of computing.

The disclosure is made in light of the above disadvantages. As described in detail below, the election process can be implemented using an election runner process for each pod and an election watcher process corresponding to each application instance. The election runner process of each pod runs for the leader, obtains the election result, and notifies the election watcher processes within the same pod of the election result and any leader status change. As such, the application instances can obtain timely knowledge of the leader status and act accordingly, without the need of modifying the application source code.

Although this disclosure uses the terms such as "pod," "container," "application," "deployment," "replica," and "process," which are commonly used in K8S development, the disclosure is not meant to be and should not be interpreted as limited to K8S. Instead, the references to K8S provide illustrative examples of the leader election techniques that can be applied to other computing platforms. One of ordinary skill in the art would understand that these terms can generally mean technical concepts that are structurally and/or functionally equivalent or similar in other platforms, environments, or systems.

Figure 1:
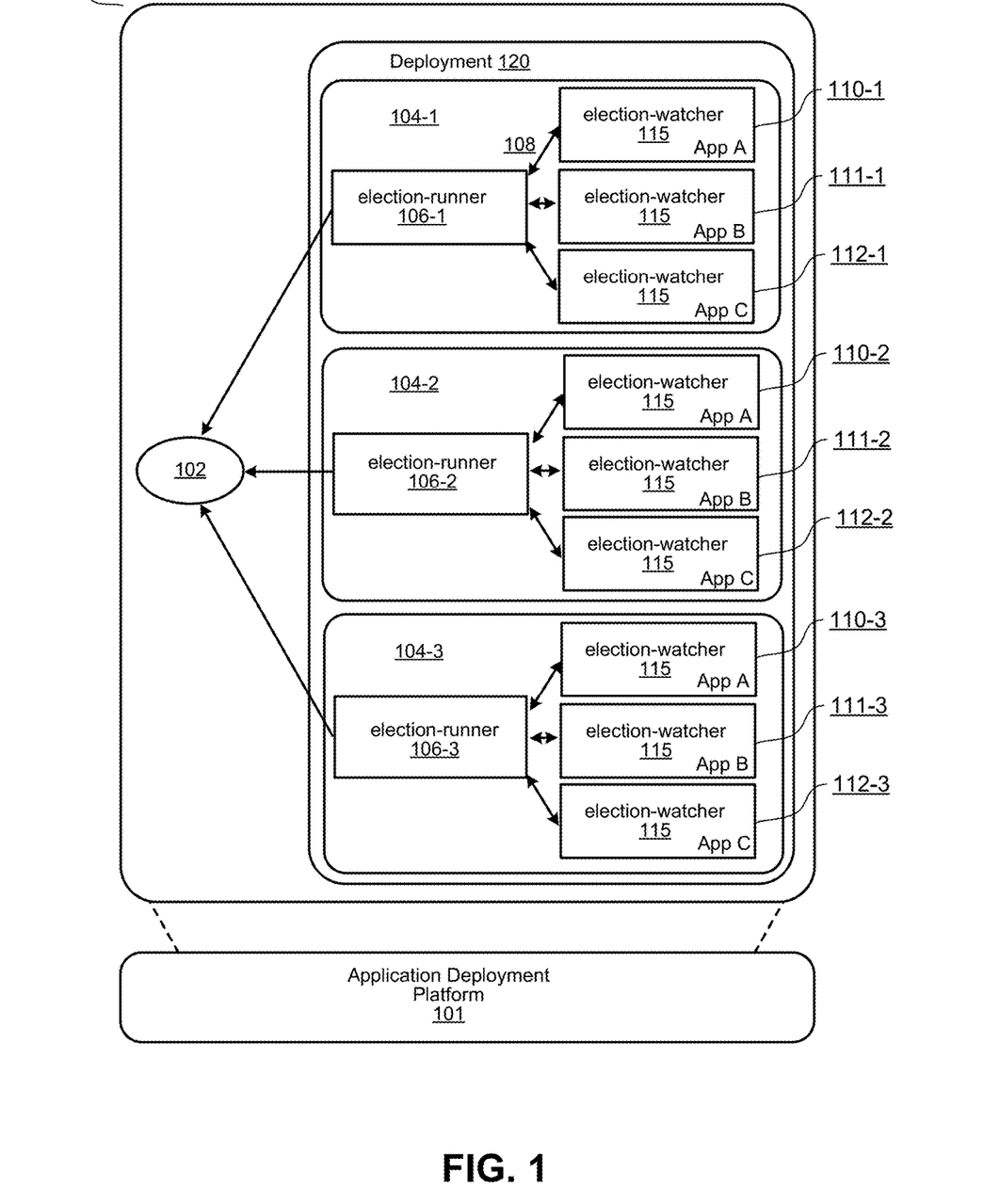
FIG. 1 illustrates an example environment in which an application deployment platform manages the execution of applications and leader elections are performed to elect leaders.

FIG. 1 illustrates an example environment 100 in which an application deployment platform 101 manages the execution of applications and leader elections are performed to elect leaders. The application deployment platform 101 can be implemented on one or more physical computers that provide a software platform 101 that deploys applications and manages the execution of the applications. The platform 101 can deploy the applications in a deployment environment 120, e.g., in a location deployment environment (e.g., one or more local servers) or a cloud computing environment. For example, the software platform can be a Kubernetes' platform that deploys and manages the execution of containers in a deployment environment 120. Via the deployment environment 120, the deployment platform 101 can provide declarative updates to applications for performing the one or more tasks.

The platform 101 can also deploy computing resources 102 for use by applications running in the deployment environment 120. The computing resources 102 can include lease resources, such as distributed databases and virtual internet protocol (IP) resources. In general, only one instance, e.g., the leader, of an application can take ownership of a lease resource. In an K8S implementation example, the computing resource 102 can be designated by the K8S platform via an Application Programming Interface (API). For example, a K8S cluster can lease a virtual IP resource to a plurality of container groups. Each container group has an instance of Kube-vip application, which is an example solution for maintaining high-available virtual IPs. The Kube-vip instances run elections to compete for the leased resource. Only the elected leader owns the lease and sets the virtual IP address in the corresponding container group, while the non-elected Kube-vip instances clear the virtual IP address in the corresponding container groups. This mechanism can ensure that the virtual IP address is set on only one container group to avoid potential conflict among the container groups.

In the example of FIG. 1, the deployment environment 120 includes three container groups 104-1, 104-2, and 104-3, e.g., three pods, deployed, where the three container groups 104-1, 104-2, and 104-3 can be replicas of each other. The number of container groups within a deployment environment is not limited to three and can be greater or less than three in other implementations.

Each container group 104 includes one or more application instances, each possibly encapsulated within a container. In the example of FIG. 1, there are three applications App A, App B, and App C, each having an instance in each of the container groups 104-1 to 104-3. In particular, container group 104-1 includes instance 110-1 of App A, instance 111-1 of App B, and instance 112-1 of App C. Similarly, container group 104-2 includes instance 110-2 of App A, instance 111-2 of App B, and instance 112-2 of App C and container group 104-3 includes instance 110-3 of App A, instance 111-3 of App B, and instance 112-3 of App C. The number of application instances within a container group is not limited to three and can be greater or less than three in other implementations.

The three applications Apps A-C can be configured to work together to perform computing tasks. Each application instance includes a corresponding election-watcher process 115. Each application instance and its corresponding election-watcher process can be encapsulated within the same container. In some implementations, the election-watcher process is assigned a process identifier (ND) of a root process, e.g., PID 1, in the corresponding container.

In addition, the container group 104-1 has an election-runner process 106-1, which can be deployed in an election-runner container. The election-runner process 106-1 starts from a standby status, communicates with the computing resource 102 to request being elected as the leader, and, if elected, becomes the leader in charge of the computing resource 102.

The container group 104-1 further includes a communication link 108 established between the election-runner process 106-1 and the election-watcher process of each application instance 110-1, 111-1, and 113-1. In the example of FIG. 1, there are three communication links 108, represented by the three bidirectional arrows. In some implementations, the communication link 108 include a bidirectional Remote Procedure Call (RPC) service such as gRPC. Via the communication link 108, each election-watcher process 115 can subscribe to the status of the election-runner process 106-1 and the election-runner process 106-1 can publish information, such as the leader election result, to each election-watcher process 115 in container group 104-1. The structure and operation of the container groups 104-2 and 104-3 are similar to those of the container group 104-1. Thus, the details of the container groups 104-2 and 104-3 are omitted from this description for brevity.

Figure 2:
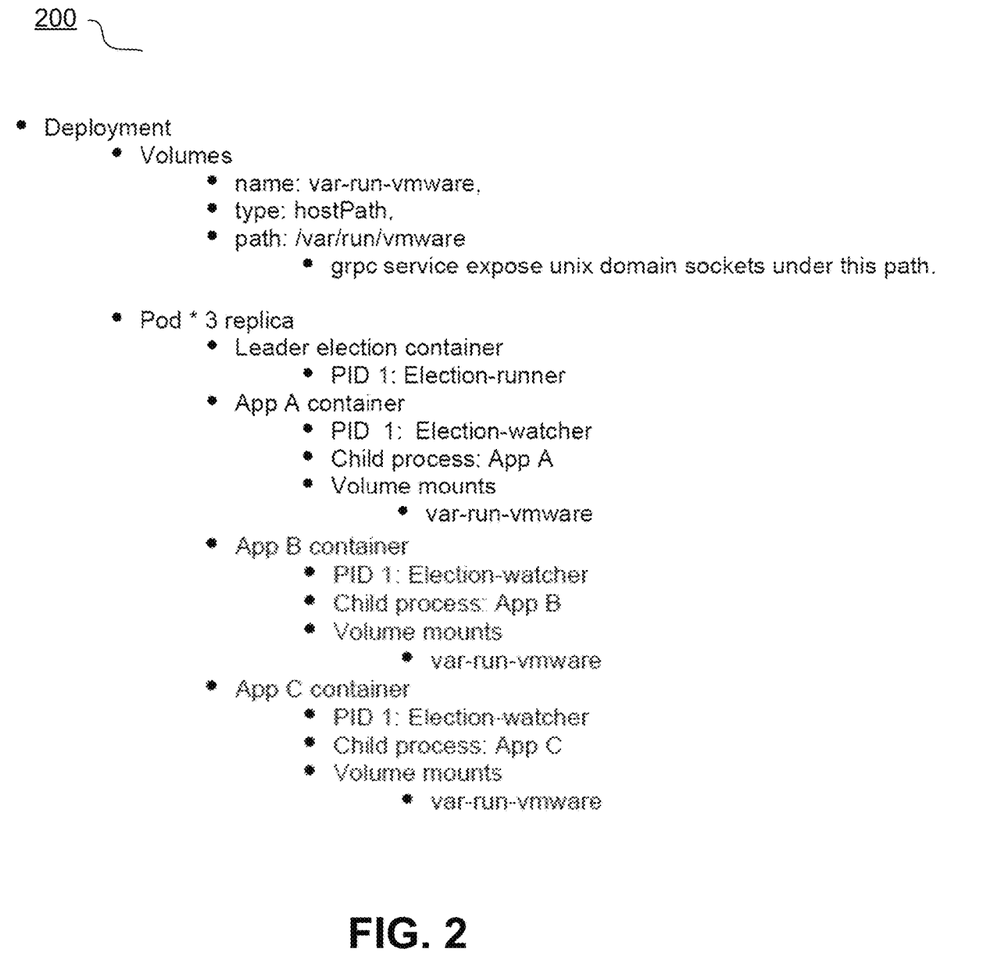
FIG. 2 illustrates a software hierarchy of an example deployment of multiple replicas of a group of containers.

FIG. 2 illustrates a software hierarchy of an example deployment 200 of multiple replicas of a group of containers. FIG. 2 shows three replicas of a pod. In each replica of the pod, an election-runner process is encapsulated within a leader election container and is assigned PID 1. Also in each replica, an instance (e.g., child process) of each of three applications is encapsulated within a corresponding container, along with an election-watcher process, also assigned PID 1. Examples of the three applications include TN Proxy, MP adapter, and CCP adapter, to name a few.

Figure 3:
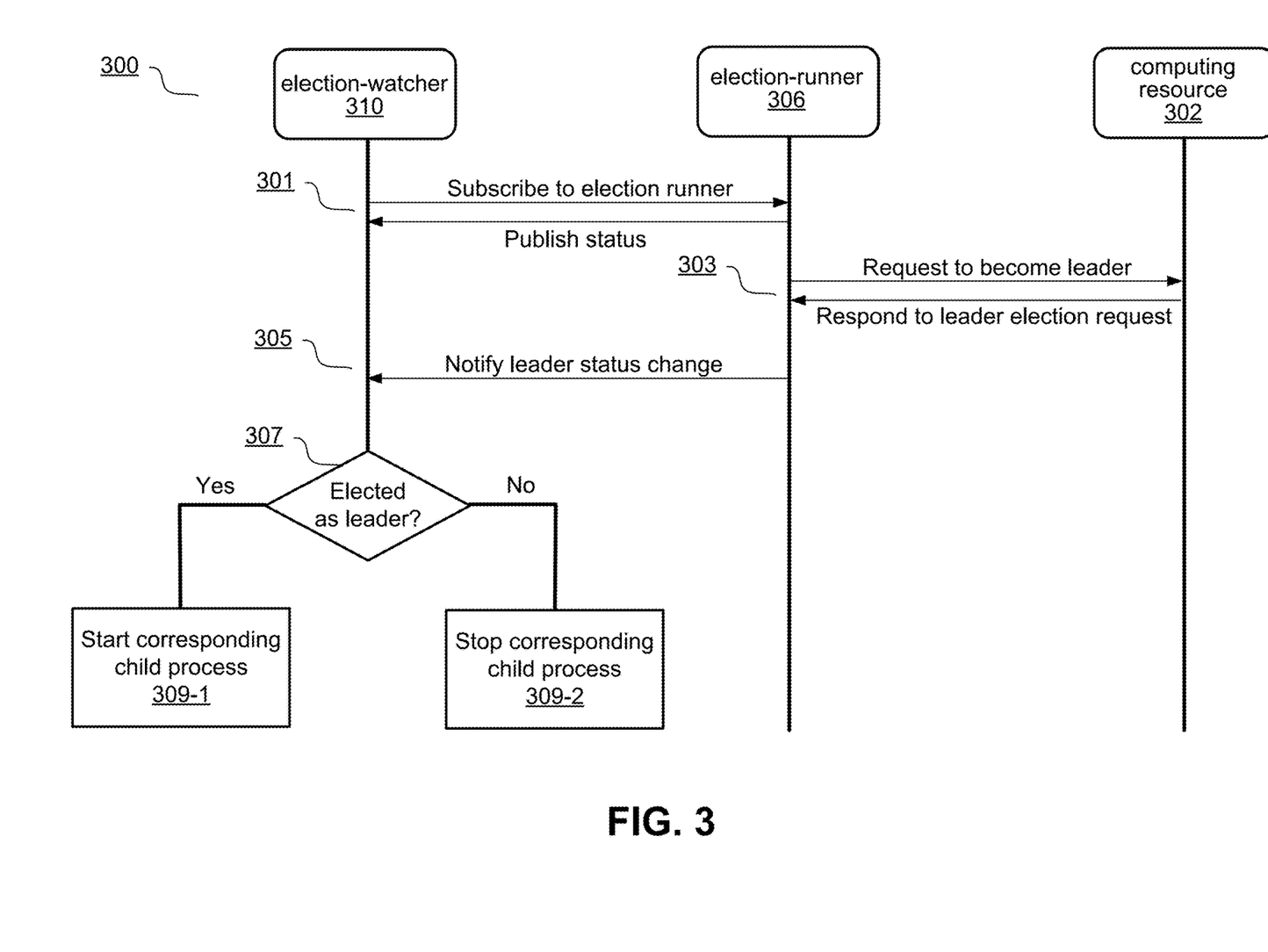
FIG. 3 illustrates an example process for electing a leader.

FIG. 3 illustrates an example process 300 for electing a leader. In particular, FIG. 3 illustrates example interactions between an election watcher process 310, an election runner process 306, and a computing resource 302, when electing a leader. The election watcher process 310 and the election runner process 306 can be deployed within the same container group, such as one of the container groups 104-1, 104-2, and 104-3 in FIG. 1. Similar operations can be performed by the corresponding components of each other container group 104-1, 104-2, and 104-3 in FIG. 1.

At step 301, the election watcher process 310 subscribes to the election runner process 306 to receive status change updates published by the election runner process 306. The subscription-publish can be via a communication link, such as the communication link 108 of FIG. 1, and can utilize a gRPC service with a server-side streaming call style. In a particular example, the election runner process 306 can expose a gRPC service to the election watcher process 310 and possibly other election watcher processes within the same container group. The election watcher process 310 calls the gRPC service to subscribe to the election runner process 306. In response to the call, the election runner process 306 publishes 310 its status as a leader or a non-leader to the election watcher process. The stream is then kept open such that the election runner process 306 publishes an updated status to the election watcher process 310 and all other subscribers whenever the election runner process 306 changes status.

Step 301 can be performed initially when the election runner process 306 and the election watcher process 310 are deployed and activated. The initial and default status of the election runner process 306 is standby, i.e., non-leader. Step 301 can also be performed later during the execution of the application instances, e.g., when the election runner process 306 activates or re-activates after the initial deployment and when the election watcher process 310 needs to know the status of the election runner process 306. If the election watcher process 310 fails to connect to the election runner process 306, the election watcher process 310 reattempts the connection until success.

Once activated, the election runner process 306 monitors a leader indicator of the deployment, such as a leader lock designated by the computing resource 302. The leader lock is a software object that, if tied to a particular process, such as an election runner process 306, indicates that the particular process is the leader. For example, the leader lock process can have fields indicating: (i) a time at which the particular process becomes the leader that takes ownership of the computing resource 302; (ii) an identity of the particular process; and (iii) a time of the last renewal of the leader status by the particular process. The particular process periodically updates the leader lock by, e.g., updating the time in field (iii), in order to maintain the leader status. Otherwise, the particular process loses the leader status and other processes, such as the election runner processes in other container groups, can compete for the leader status in an election. Only the elected leader process can update the leader lock while the other non-elected processes can only monitor the leader lock without updating it.

At step 303, the election runner process 306 determines, based on its monitoring of the leader indicator, that the leader role is available. The election runner process 306 thus sends a request to the computing resource 302 to become the leader, e.g., to be included in the leader election as a leader candidate. Similarly, the election runner processes in other container groups can send requests to be included as leader candidates. The computing resource 302 elects a leader from all leader candidates and responds to the leader election request of the election runner process 306. If the election runner process 306 is elected as the leader, the leader lock is tied to the election runner process 306. The election runner process 306 continuously updates the leader lock to maintain the leader status. If the election runner process 306 is not elected as the leader, the election runner process 306 changes its status to standby. For example, the election runner process 306 can enter a sleep status for a period of time and then transition to the standby status.

At step 305, the election runner process 306 notifies the election watcher process 310 of a leader status change, either from non-leader to leader or from leader to non-leader. The notification is made to all election watcher processes that are subscribed to the election runner process 306 and can be via the subscription-publish link established at step 301. In some implementations, the notification can be made to all subscribing election watcher processes at the same time.

At step 307, the election watcher process 310 determines whether the election runner process 306 has been elected as a leader, i.e., whether the status of the election runner process 306 changes from non-leader to leader. The election watcher process 310 then reacts to the status change accordingly.

If the election watcher process 310 determines that the election runner process 306 is elected as the leader, the election watcher process 310 responds following step 309-1 to start the corresponding child process, i.e., the application instance, such as TN Proxy, MP adapter, or CCP adapter named above with reference to FIG. 2. These application instances started by the election watcher process 310 thus each become the leader of all instances of the same application in the deployment. For example, an instance of TN Proxy corresponding to, e.g., started by, the election watcher process 310 becomes the leader of all TN Proxy instances in the deployment. Similarly, an instance of MP adapter corresponding to, e.g., started by, the election watcher process 310 becomes the leader of all MP adapter instances in the deployment and an instance of CCP adapter corresponding to, e.g., started by, the election watcher process 310 becomes the leader of all CCP adapter instances in the deployment.

The election watcher process 310 then monitors the child process. If the child process crashes, the election watcher process 310 receives a signal, such as SIGCHILD, from an operating system on which the election watcher process 310 runs. The election watcher process 310 then fetches an exit code of the child process and exits itself using the exit code.

The election watcher process 310 also watches for any exit signals directed to itself. These exit signals can include SIGTERM, SIGINT, and SIGHUP. Upon receiving an exit signal, the election watcher process 310 sends the same exit signal to the corresponding child process to direct the child process to exit. Once the child process exits, the election watcher process 310 also exits using the exit code of the child process.

If the election watcher process 310 determines that the election runner process 306 loses status as the leader, the election watcher process 310 reacts following step 309-2 to stop ("kill") the corresponding child process. In addition, whenever the election watcher process 310 loses connection to the election runner process 306, the election watcher process 310 kills the corresponding child process and attempts to reconnect.

To kill a corresponding child process, the election watcher process 310 first sends an exit signal, such as SIGTERM, to the child process. The election watcher process 310 then waits a period, e.g., 10 seconds, for the child process to exit. If the child process does not exit after the period, the election watcher process 310 sends another exit signal, such as SIGKILL, to the child process and exits itself.

As noted above, the election watcher process 310 can be assigned the PID=1, which corresponds to a root process within the election-watcher container. As such, in the event the election watcher process 310 crashes or terminates, the whole election-watcher container terminates and restarts. Upon reactivation, the election watcher process 310 again subscribes to the election runner process 306 to obtain the latest leader information, as described in step 301. This mechanism can avoid a situation where a child process loses track of the leader as a result of the crash or termination of the corresponding election watcher process.

Figure 4:
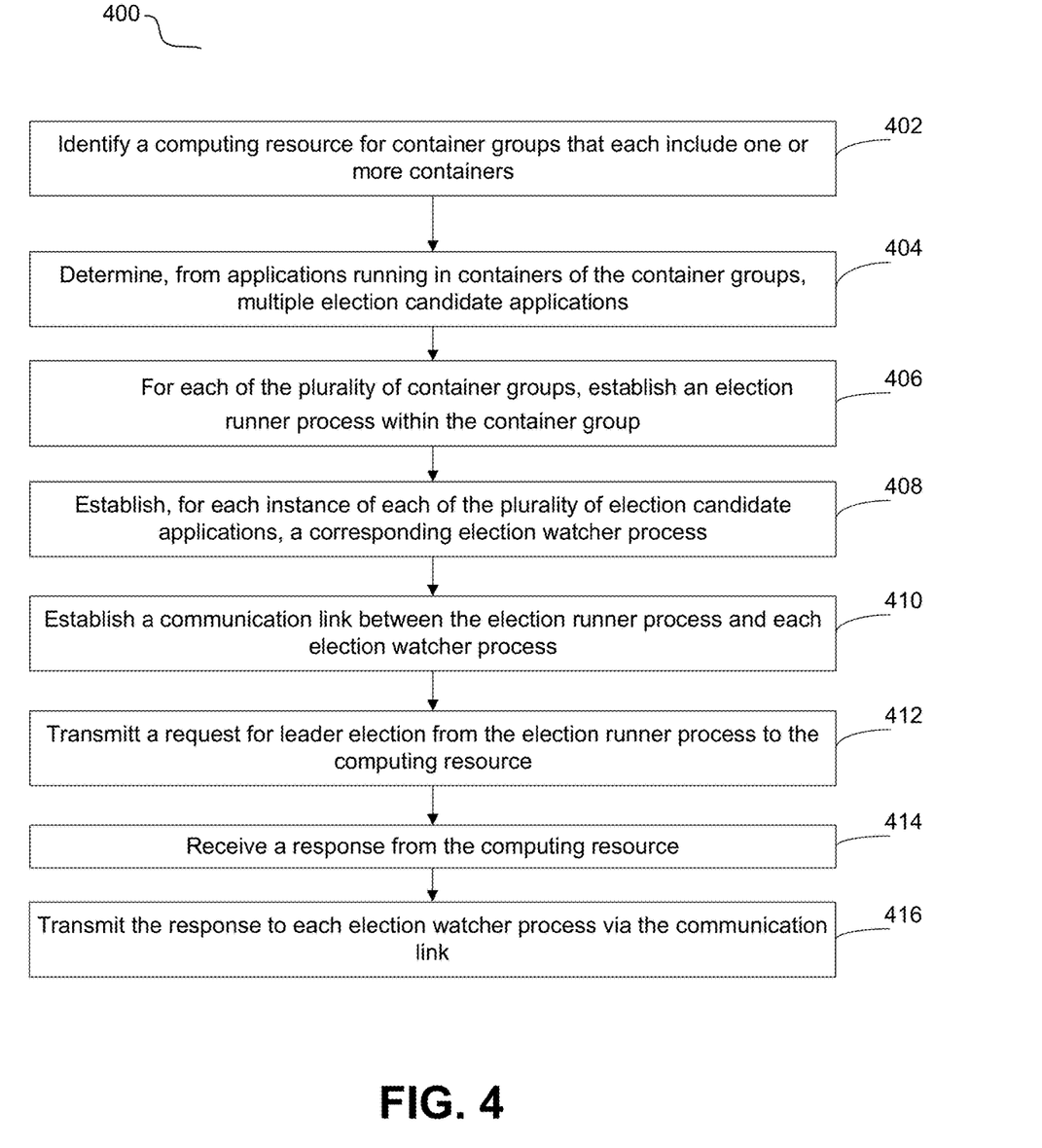
FIG. 4 illustrates an example process for electing a leader.

FIG. 4 illustrates an example process 400 for electing a leader. The process 400 can be implemented on an application deployment platform, such as the application deployment platform 101 described above with reference to FIG. 1. The steps of the process 400 and the elements involved therein can correspond to the operations and the features described above with reference to FIGS. 1-3.

At step 402, a computing resource for multiple container groups is identified by, e.g., the application deployment platform 101. As described herein, each container group includes one or more containers. Each container includes an application and its dependencies. Although this process 400 is described in terms of containerized applications, a similar process can be performed for other types of applications that can be replicated.

At step 404, a set of election candidate applications is identified by, e.g., the deployment environment 120. Each election candidate application can have an instance deployed in each of multiple container groups.

At step 406, an election runner process is established within each of the multiple container groups. For example, the platform 101 can deploy an election runner container in each container group. Each election runner container can include an election runner process, e.g., as the root process of the election runner container.

At step 408, a corresponding election watcher process is established for each instance of each election candidate application. For example, the platform 101 can deploy an election watcher container corresponding to each instance of election candidate application. Each election watcher container can include an election watcher process, e.g., as the root process of the election watcher container.

At step 410, a communication link is established between the election runner process and each election watcher process. For example, the communication link can be implemented as the communication link 108 in FIG. 1 and may include a bidirectional RPC service.

At step 412, a request for leader election is transmitted from the election runner process to the computing resource. Consistent with step 303 of the method 300 in FIG. 3, the request for leader election can be transmitted by the election runner process upon determining that the leader role is available.

At step 414, a response from the computing resource is received. Consistent with step 303 of the method 300 in FIG. 3, the response can be received by the election runner process from the computing resource to notify the election runner process of the leader election result.

At step 416, a response is transmitted to each election watcher process via the communication link. By transmitting the response to each election watcher process, the election runner process can publish any leader status change so that each election watcher process can respond accordingly, such as starting or stopping the corresponding child process.

Although steps of the method 400 are numbered in order, implementations of this method are not required to execute the steps in the order they are numbered. It is possible that some implementations execute these steps in different orders or in parallel. For example, step 408 can, in some implementations, take place earlier than or in parallel with step 406.

Figure 5:
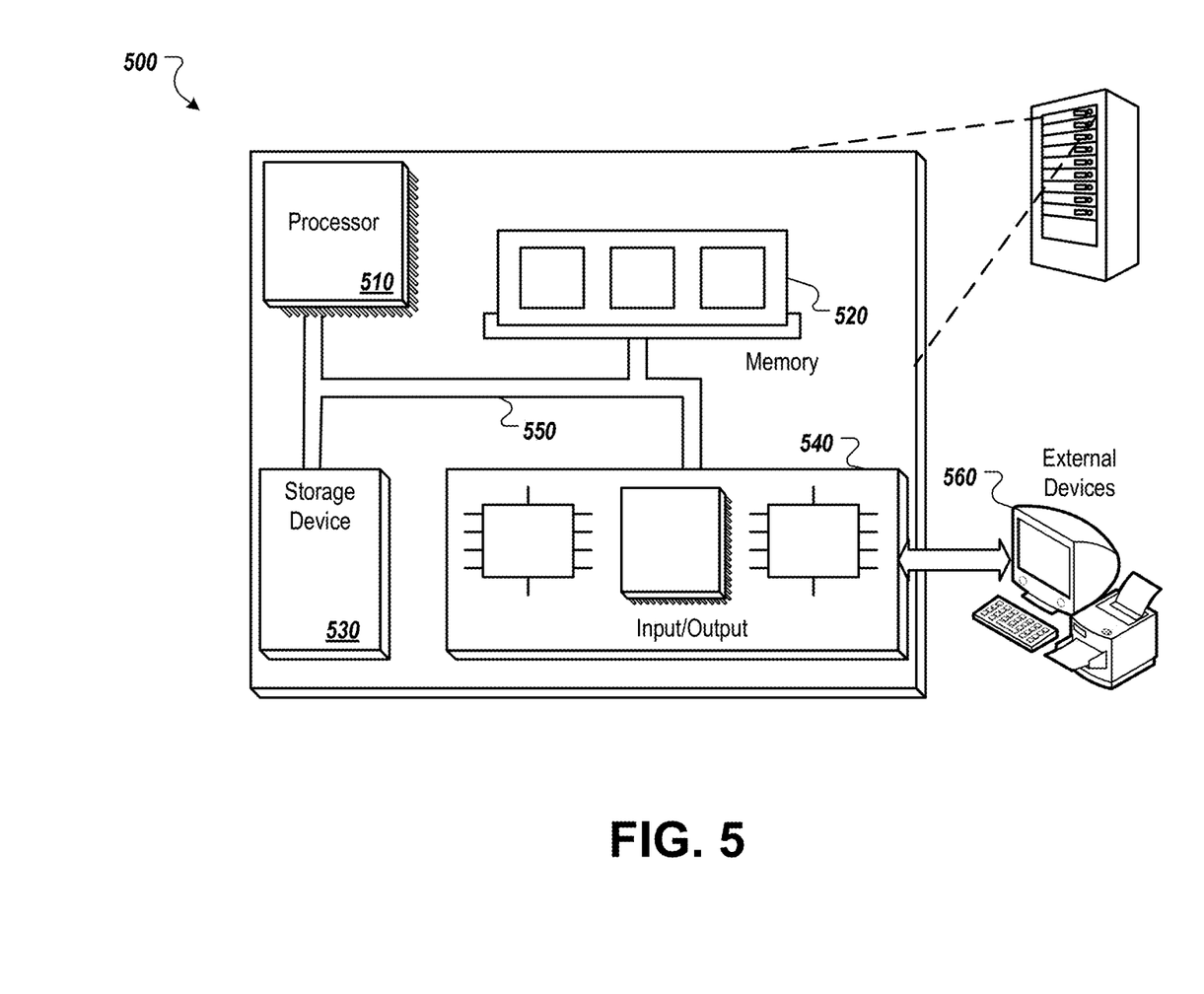
FIG. 5 illustrates an example computer system according to one or more implementations.

FIG. 5 is a block diagram of an example computer system 500 in accordance with implementations of the present disclosure. The system 500 includes a processor 510, a memory 520, a storage device 530, and one or more input/output interface devices 540. Each of the components 510, 520, 530, and 540 can be interconnected, for example, using a system bus 550.

The processor 510 is capable of processing instructions for execution within the system 500. The term "execution" as used here refers to a technique in which program code causes a processor to carry out one or more processor instructions. In some implementations, the processor 510 is a single-threaded processor. In some implementations, the processor 510 is a multi-threaded processor. The processor 510 is capable of processing instructions stored in the memory 520 or on the storage device 530. The processor 510 may execute operations such as those described with reference to other figures described herein.

The memory 520 stores information within the system 500. In some implementations, the memory 520 is a computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 can include, for example, a hard disk device, an optical disk device, a solid-state drive, a flash drive, magnetic tape, or some other large capacity storage device. In some implementations, the storage device 530 may be a cloud storage device, e.g., a logical storage device including one or more physical storage devices distributed on a network and accessed using a network. In some examples, the storage device may store long-term data. The input/output interface devices 540 provide input/output operations for the system 500. In some implementations, the input/output interface devices 540 can include one or more of a network interface devices, e.g., an Ethernet interface, a serial communication device, e.g., an RS-232 interface, and/or a wireless interface device, e.g., an 802.11 interface, a 3G wireless modem, a 4G wireless modem, a 5G wireless modem, etc. A network interface device allows the system 500 to communicate, for example, transmit and receive data. In some implementations, the input/output device can include driver devices configured to receive input data and send output data to other input/output devices, e.g., keyboard, printer and display devices 560. In some implementations, mobile computing devices, mobile communication devices, and other devices can be used.

A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

In some examples, the system 500 is contained within a single integrated circuit package. A system 500 of this kind, in which both a processor 510 and one or more other components are contained within a single integrated circuit package and/or fabricated as a single integrated circuit, is sometimes called a microcontroller. In some implementations, the integrated circuit package includes pins that correspond to input/output ports, e.g., that can be used to communicate signals to and from one or more of the input/output interface devices 540.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an field programmable gate array (FPGA) or an application-specific integrated circuit (ASIC). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

What is claimed is:

1. A computer-implemented method for electing a leader in a computing system, the method comprising:
    identifying a computing resource for a plurality of container groups that each comprise one or more containers;
    determining, from applications running in containers of the container groups, a plurality of election candidate applications, wherein each of the plurality of election candidate applications has an instance deployed in a corresponding container in each of the plurality of container groups;
    for each of the plurality of container groups:
        establishing an election runner process within the container group;
        establishing, for each instance of each of the plurality of election candidate applications, a corresponding election watcher process;
        establishing a communication link between the election runner process and each election watcher process;
        transmitting a request for leader election from the election runner process to the computing resource;
        receiving a response from the computing resource, wherein receiving the response comprises obtaining the response from a leader lock object, the response indicating whether the election runner process in a given container group is elected as the leader; and
        transmitting the response to each election watcher process via the communication link.

2. The method of claim 1,
    wherein the response indicates that the election runner process in the given container group is elected as the leader, and
    wherein the method further comprises:
        running the instance of each of the plurality of election candidate applications in the given container group;
        periodically updating the leader lock object with a leader status by the election runner process in the given container group; and
        transmitting the leader status from the election runner process in the given container group to each election watcher process in the given container group.

3. The method of claim 2, further comprising:
    in response to the leader status indicating that the election runner process in the given container group is no longer the leader, terminating the instance of each of the plurality of election candidate applications in the given container group.

4. The method of claim 1,
wherein the response indicates that the election runner process in a given container group is not elected as the leader, and
wherein the method further comprises:
causing the election runner process in the given container group to enter a standby state; and
terminating the instance of each of the plurality of election candidate applications in the given container group.

5. The method of claim 1, wherein the request transmitted by each container group indicates instances of the election candidate applications deployed in the container group.

6. The method of claim 1, wherein, for each container group:
establishing the election runner process comprises deploying an election runner container within the container group, and
establishing the corresponding election watcher process for each instance of each of the plurality of election candidate applications comprises initiating the corresponding election watcher process for each instance in a same corresponding container as the instance.

7. The method of claim 6, further comprising, for each container group, assigning each election watcher process a process identifier (PID) of a root process in the corresponding election watcher container.

8. The method of claim 1, wherein the communication link comprises a bidirectional Remote Procedure Call (RPC) service.

9. The method of claim 1, wherein, for each container group:
establishing the election runner process comprises deploying an election runner container within the container group, and
establishing the corresponding election watcher process for each instance of each of the plurality of election candidate applications comprises initiating the corresponding election watcher process for each instance in a same corresponding container as the instance.

10. A computing system configured to elect a leader from a plurality of election candidate applications, the computing system comprising: a server; and a plurality of container groups, wherein
the server allocates a computing resource for the plurality of container groups,
each of the plurality of election candidate applications has an instance deployed in a corresponding container in each of the plurality of container groups,
each of the plurality of container groups comprises:
an election runner process;
an election watcher process corresponding to each instance of each of the plurality of election candidate applications; and
a communication link between the election runner process and each election watcher process,
the election runner process transmits a request for leader election to the computing resource,
the election runner process receives a response from the computing resource, and
the election runner process transmits the response to each election watcher process via the communication link,
the response is obtained from a leader lock object, and
the response indicates whether the election runner process in a given container group is elected as the leader.

11. The computing system of claim 10, wherein
the response indicates that the election runner process in the given container group is elected as the leader,
the instance of each of the plurality of election candidate applications in the given container group starts to run,
the election runner process in the given container group periodically updates the leader lock object with a leader status, and
the election runner process in the given container group transmits the leader status to each election watcher process in the given container group.

12. The computing system of claim 11, wherein the instance of each of the plurality of election candidate applications in the given container group terminates in response to the leader status indicating that the election runner process in the given container group is no longer the leader.

13. The computing system of claim 10, wherein
the response indicates that the election runner process in a given container group is not elected as the leader,
the election runner process in the given container group enters a standby state, and
the instance of each of the plurality of election candidate applications in the given container group terminates.

14. The computing system of claim 10, wherein the request transmitted by each container group indicates instances of the election candidate applications deployed in the container group.

15. The computing system of claim 10, wherein, within each container group,
the election runner process is encapsulated within an election runner container, and
the instance of each election candidate application and the election watcher process corresponding to the instance are encapsulated within a same election watcher container.

16. The computing system of claim 15, wherein, for each container group, each election watcher process is assigned a process identifier (PID) of a root process in the corresponding election watcher container.

17. The computing system of claim 10, wherein the communication link comprises a bidirectional Remote Procedure Call (RPC) service.

18. A non-transitory computer-readable medium containing program instructions for causing a processor to perform operations comprising:
identifying a computing resource for a plurality of container groups that each comprise one or more containers;
determining, from applications running in containers of the container groups, a plurality of election candidate applications, wherein each of the plurality of election candidate applications has an instance deployed in each of the plurality of container groups;
for each of the plurality of container groups:
establishing an election runner process within the container group;
establishing, for each instance of each of the plurality of election candidate applications, a corresponding election watcher process;
establishing a communication link between the election runner process and each election watcher process;
transmitting a request for leader election from the election runner process to the computing resource;

receiving a response from the computing resource, wherein receiving the response comprises obtaining the response from a leader lock object, the response indicating whether the election runner process in a given container group is elected as the leader; and transmitting the response to each election watcher process via the communication link.

19. The non-transitory computer-readable medium of claim 18, wherein the response indicates that the election runner process in the given container group is elected as the leader, and wherein the operations further comprise:

running the instance of each of the plurality of election candidate applications in the given container group;

periodically updating the leader lock object with a leader status by the election runner process in the given container group; and transmitting the leader status from the election runner process in the given container group to each election watcher process in the given container group.

20. The non-transitory computer-readable medium of claim 19, in response to the leader status indicating that the election runner process in the given container group is no longer the leader, terminating the instance of each of the plurality of election candidate applications in the given container group.

* * * * *